United States Patent [19]

Graf et al.

[11] Patent Number: 4,985,079
[45] Date of Patent: Jan. 15, 1991

[54] OPEN-GRADED ASPHALT EMULSION MIXES

[75] Inventors: Peter E. Graf, Orinda; Steven J. Agazzi, Walnut Creek; Eugene J. Vanderzanden, Piedmont, all of Calif.

[73] Assignee: Chevron Research Company, San Francisco, Calif.

[21] Appl. No.: 334,017

[22] Filed: Apr. 5, 1989

Related U.S. Application Data

[63] Continuation-in-part of Ser. No. 926,035, Oct. 31, 1986, Pat. No. 4,822,427.

[51] Int. Cl.$^5$ .................... C09D 3/387; C09D 3/24
[52] U.S. Cl. .................... 106/502; 106/401; 106/448; 106/449; 252/311.5
[58] Field of Search ............... 106/401, 448, 499, 502; 252/311.5

[56] References Cited

U.S. PATENT DOCUMENTS

| | | | |
|---|---|---|---|
| 3,518,101 | 6/1970 | Gzemski et al. | 106/277 |
| 3,728,278 | 4/1973 | Tramelli | 106/277 |
| 3,738,852 | 6/1973 | Doi et al. | 106/277 |
| 3,859,227 | 1/1975 | Dwyer | 106/277 |
| 3,867,162 | 2/1975 | Elste, Jr. et al. | 106/277 |
| 3,957,524 | 5/1976 | Doughty et al. | 106/277 |
| 4,007,127 | 2/1977 | Smadja et al. | 252/311.5 |
| 4,523,957 | 6/1985 | Graf et al. | 252/311.5 |

*Primary Examiner*—William R. Dixon, Jr.
*Assistant Examiner*—Willie J. Thompson
*Attorney, Agent, or Firm*—R. C. Gaffney; J. J. DeYoung

[57] ABSTRACT

Disclosed is a medium set cationic bituminous emulsion comprising, relative to the emulsion:
  a. about 40 to 75% by weight asphalt;
  b. 0.25 to 5% by weight of a cationic emulsifier;
  c. 0.1 to 0.5% by weight of a nonionic water-soluble thickening agent;
  d. 0 to 8% of a low-boiling hydrocarbon; and
  e. water as a continuous phase of said emulsion to make up 100% by weight;

wherein said medium set emulsion when combined with open-graded aggregate produces a mix which has a thick coating of emulsion on said aggregate surface and said mix is workable and results in minimum runoff.

21 Claims, No Drawings

4,985,079

OPEN-GRADED ASPHALT EMULSION MIXES

CROSS-REFERENCE TO RELATED APPLICATION

This application is a continuation-in-part of Ser. No. 926,035, filed Oct. 31, 1986, now U.S. Pat. No. 4,822,927 the entire disclosure of which is incorporated herein by reference.

BACKGROUND OF THE INVENTION

Field of the Invention

This application relates to open-graded, emulsified asphalt pavements, compositions suitable for their preparation, and methods for their preparation.

Open-graded pavements are generally defined in the paving art as aggregate blends or asphalt mixtures which have high voids content. The pavements may be prepared with either hot-mix asphalt or with asphaltic emulsions. They possess the characteristics of relatively low cost, and the ability to allow water drainage through the pavement structure. This last feature makes the pavements particularly desirable for overlays on existing high-speed highways to prevent "hydroplaning" vehicle skids caused by a film of water created between a smooth pavement surface and the tire surface.

The open-graded, emulsified asphalt pavements are of particular interest in remote areas far from plants where hot-mix asphalts are available. With the use of the emulsified asphalts, blending of the emulsions with the aggregates may be performed in blending plants set up easily in the remote areas.

With the use of emulsified asphalts in constructing open-graded pavements, several problems have, however, arisen. Because of the porous nature of the mix, the use of conventional slow setting emulsions (SS type) is not feasible. In such case, substantial amounts of the emulsion will drain from the structure (runoff) before setting occurs, resulting in loss of asphalt. The onset of rain before complete set occurs will result in the loss of even more asphalt from the pavement (washoff). Both runoff and washoff result in loss of strength in the pavement and possible environmental contamination. Therefore, to reduce these problems, the emulsions used in these applications have been weakly stabilized medium setting (MS type) so designed that they "break" when mixed with the aggregate. However, because of this early break, incomplete coating of the aggregate and poor adhesion of the asphalt and aggregate often occurs. In most cases, these results have been ameliorated by the addition of substantial quantities (5 to 15%, usually 8 to 10%, by weight relative to the weight of emulsion) of petroleum naphtha to the mixes. This results in softening of the asphalt providing better coverage and adhesion.

With the use of naphtha, new problems have arisen. First, the cost is high for the naphtha which is simply lost to the atmosphere by evaporation. Second, evaporation of the naphtha raises possible air pollution problems. Third, the hazard of fire during the operation is enhanced. Fourth, because naphtha softens the asphalt, the pavement requires considerable time to achieve full strength, and the use of heavy vehicles on the pavement before full strength is achieved may result in rutting of the surface. Therefore, it is desirable to produce open-graded emulsified asphalt paving mixes which display good aggregate coating properties and achieve desirable runoff and washoff characteristics while producing a workable mix with minimum use of naphtha and which forms pavements which develop their full strength rapidly.

U.S. Pat. No. 4,523,957 discloses low naphtha content open graded asphalt emulsions containing ionic polyelectrolytes.

U.S. Pat. No. 4,548,966 discloses an asphalt emulsion containing a modified starch consisting of not more than about 27 percent amylose and the balance substantially amylspectin. The modified starches disclosed in this patent are waxy or cross-linked starches which are substantially insoluble in water.

U. S. Pat. No. 3,738,852 relates to an asphalt-in-water emulsion in which there is an emulsifier consisting essentially of a mixture of water-soluble salt of a monoamine having a long chain alkyl or alkenyl group of 8 to 22 carbon atoms and a water-soluble salt of a triamine having a long chain alkyl or a alkenyl group of 8 to 12 carbon atoms. Also included in the disclosure are additives such as methyl cellulose and polyvinyl alcohol, among others.

SUMMARY OF THE INVENTION

Disclosed is a medium set cationic bituminous emulsion comprising, relative to the emulsion:
 a. about 40 to 75% by weight asphalt;
 b. 0.25 to 5% by weight of a cationic emulsifier;
 c. 0.1 to 0.5% by weight of a nonionic water-soluble thickening agent;
 d. 0 to 8% of a low-boiling hydrocarbon; and
 e. water as a continuous phase of said emulsion make up 100% by weight;
wherein said medium set emulsion when combined with open-graded aggregate produces a mix which has a thick coating of emulsion on said aggregate surface and said mix is workable and results in minimum runoff.

DETAILED DESCRIPTION OF THE INVENTION

This invention is based on the discovery that including a water-soluble thickening agent in the emulsion extends the working time before the emulsion breaks and the mix stiffens in the absence of high levels of naphtha. In this way, open-graded aggregates and emulsions can be mixed, placed, and rolled with little interruption of traffic and without exceeding proposed limits on naphtha emissions.

The emulsified asphalt composition of this invention contains little or no naphtha and can be used for the same purposes as the conventional systems. The new composition is a cationic asphalt-water emulsion comprising the following proportions by weight:
 a. 40 to 75% asphalt, preferably 60 to 70%;
 b. 0.25 to 5% cationic emulsifier(s), preferably 0.4 to 2%;
 c. 0.1 to 0.5% thickening agent, preferably 0.2 to 0.4%;
 d. 0 to 8% of a low-boiling hydrocarbon, preferably 0.01 to 3% and more preferably less than 2%; and
 e. the balance, water.

The emulsion is formed in the usual way. A water solution containing the emulsifier(s) and thickening agent is combined with heated asphalt (generally 240° F. to 280° F.) in an emulsion mill. Alternatively, the cationic emulsion can be formed with asphalt and emulsifier solution alone and the thickening agent added to the final emulsion. No special equipment or process steps are needed to prepare these emulsions.

Definitions

A "workable mix" is a term well known in the asphalt art. As used herein, "workable mix" means a mix that will pass through a standard commercial paver machine, such as those made by Barber-Greene. Operation of the paver machine includes mixing the emulsion and aggregate until coating of the aggregate is achieved followed by transport into the paver including passing under a screed for even application of the asphalt mix.

One aspect of the definition of "workable" mix is that it is a mix in which the aggregate emulsion mixture is relatively free-flowing. Workability can be measured by a spoon and bowl test as described in "The Open-Graded Workability Test", Example 1. Workable mixtures are not stiff, i.e., the aggregate is not primarily stuck together in several large clumps or one very large clump; workable mixtures are either loose and popcorn-like, i.e., containing only free-flowing aggregate, or are of medium workability.

By "medium workability" it is meant that at least 40% of the aggregate asphalt in the mixture is free-flowing after 2 minutes mixing in the well known spoon and bowl test. Preferably, the emulsions of this invention have at least 50% of the aggregate asphalt mixture free-flowing after 2 minutes mixing in the spoon and bowl test, more preferably greater than 60%.

By the term "free-flowing" it is meant that portion of the aggregate to asphalt in the mixture that is in clumps of less than 5 stones of ⅜ to ⅝ inch sizes, generally these clumps contain less than 3 stones. One method of measuring the percent of free-flowing aggregate is described in "The Open-Graded Workability Test" of Example 1.

By "medium set" is meant that the emulsion is stable for about 30 seconds to about 30 minutes when stirred with open-graded aggregate at low shear. Preferably, the emulsion breaks in about 1 to about 5 minutes when stirred with open-graded aggregate at low shear. Volume 4.03, ASTM D2397 describe the requirements of CMS-2 and CMS-2h medium-setting cationic emulsified asphalts. These ASTM specifications are incorporated herein by reference and are those that the emulsified asphalts of our invention meet.

By the term "thick coating" is meant a bituminous coating on the aggregate wherein the edges of the aggregate stones cannot be seen. The thick coatings of this invention are produced by using thickened emulsifying water. Acceptable thickened emulsifying waters have a Brookfield viscosity at 75° F. (Brookfield RVT viscometer) of at least 20 centipoise (cp), preferably between 50-1000 centipoise and more preferably between 100 and 700 centipoise. Emulsifying waters of too low a viscosity do not provide thick coatings, while emulsifying waters of too high a viscosity cannot be pumped through asphalt equipment.

By the term "minimum runoff" is meant less than 10 percent by weight, preferably less than 5 percent and most preferably less than 1 percent of the total emulsion added to the aggregate mix. Percent runoff is further described in Example 4.

The Asphalt

The asphalt may be a natural bitumen, a residuum from crude oil distillation, and/or solvent deasphalting or an air-blown product. It generally is a material defined by its penetration range at 77° F., e.g., 100 to 250, 40 to 90. The asphalt will be present in the emulsion in the amount of from about 40 to 75%, preferably 60 to 70%, by weight relative to the emulsion. The balance of the emulsion will be water to make 100%.

The Emulsifiers

The emulsion is prepared by mixing molten asphalt and an aqueous solution of emulsifier under high shear at elevated temperature. Preferred are the cationic emulsifiers.

One type of suitable asphalt emulsion is prepared with cationic emulsifiers. Among those are the emulsions described in U.S. Pat. Nos. 3,026,266, 3,096,292, 3,220,953, and 3,445,258. Any suitable cationic emulsifier capable of emulsifying bitumen in water may be used including cation active salts of quaternary nitrogen bases, salts of fatty amines, preferably straight-chain primary fatty mono and diamines, amidoamine salts, such as amidoamine hydrochloride of stearic acid, etc., the hydrohalide salts of aminoamides of polyalkylene polyamines such as tetraethylene pentamines and fatty acids, etc. Another class of suitable emulsifiers is that including the salts of ethylene oxide adducts of fatty diamines and of the ethylene oxide adducts of hydrocarbon-substituted imidazolines. This list is, of course, only illustrative, and not inclusive. The use of mixture of the various cationic emulsifiers is also contemplated. The preferred cationic emulsifiers are those described as the salts of quaternary nitrogen bases disclosed in U.S. Pat. No. 3,220,953. These compounds are those materials of the preferred formula

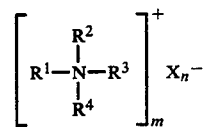

in which $R^1$, $R^2$, $R^3$ and $R^4$ are organic radicals, each having a carbon-nitrogen linkage to the nitrogen atom, X is an anion whose valence does not exceed 2, and m and n are small integers which indicate the molar proportions of the cation and anion required to form the respective salt. Preferred emulsifying salts are those in which the organic radicals $R^1$, $R^2$, $R^3$ and $R^4$ are alkyl, alkenyl, hydroxyalkyl, arylalkyl or alkylaryl radicals of 1 to 24 carbons atoms or heterocyclic groups of 4 to 10 carbon atoms in which from 2 to 3 of the nitrogen valences are shared by two carbon atoms in a single heterocyclic group. In all of these salts of quaternary nitrogen bases suitable for use as cationic emulsifiers in the preparation of oil-in-water type emulsions the aggregate number of carbon atoms in the cationic portion of their molecule should be large enough to impart oil solubility and emulsifying properties, and preferably should be equal to and not less than 15 and not more than 30 carbon atoms. In other words, this class of cationic quaternary nitrogen-containing compounds is formed by salts of tetra-substituted ammonium bases and by salts of heterocyclic nitrogen bases, such as pyridinium, quinolinium, isoqunilinium, morpholinium, piperidinium, imidazolinium, and other like quaternary nitrogen-containing bases. The anion may be either a halide (X—), a methosulfate ($SO_4CH_3$—), a nitrate ($NO_3$—) or the like ion. Monovalent anions are preferred, particularly the halide anions.

Numerous cationic quaternary nitrogen-containing emulsifiers may be employed for the preparation of cationic oil-in-water type emulsions Among them, to mention but a few, are:

N,N-dimethyl-N-benzyl-N-octadecyl ammonium chloride,
19 N,N-dimethyl-N-hydroxyethyl-N-dodecyl ammonium chloride,
N,N-dimethyl-N-benzyl-N-octadecenyl ammonium chloride,
N,N-dimethyl-N-benzyl-N-dodecyl ammonium chloride,
N,N-dimethyl-N-hydroxyethyl-N-benzyl ammonium chloride,
Hexadecyl pyridinium chloride,
Hexadecyl triethyl ammonium bromide,
Octadecylbenzyl trimethyl ammonium methosulfate,
Isopropylnaphthyl trimethyl ammonium chloride,
Octadecyl pyridinium bromide, 1-(2-hydroxyethyl)-2heptadecenyl-1-(4-chlorobutyl)imidazolinium chloride,
Hexadecyl methyl piperidinium methosulfate,
Dodecyl hydroxyethyl morpholinium bromide.

Among the quaternary nitrogen-containing materials available in commerce as cationic emulsifiers for the preparation of oil-in-water type emulsions, there are quaternary ammonium salts, such as quaternary ammonium halide materials sold by General Mills under the trademark "ALIQUAT"; materials sold by Armak Company under the several "ARQUAD" trademarks; certain quaternized materials developed and sold by the Society of Chemical Industry, in Basel, Switzerland, under the several "SAPAMINE" trademarks, and many others.

The active cationic component of these materials contains the characteristic positively charged quaternary nitrogen configuration

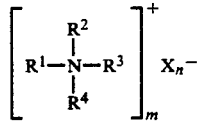

in which the aggregate of carbon atoms of $R^1$, $R^2$, $R^3$ and $R^4$ is sufficient to impart oil solubility and emulsifying properties, and preferably is equal to not less than 15 and not more than 30 carbon atoms.

Best emulsification can be achieved with those among the aforesaid quaternary nitrogen-containing materials in which the active cationic component contains at least one long aliphatic hydrocarbon chain of not less than 12 and not more than 24 carbon atoms, such as an alkyl or an alkenyl chain. This latter chain may be derived from a mixture of organic materials such as tallow, soybean oil, lard, etc.

The emulsifier material may consist entirely of an active cationic salt of a quaternary nitrogen base, or may also contain some impurities, such as acyl chlorides and amines. It may also be employed in the form of a concentrated aqueous solution and may contain auxiliary stabilizers in amounts conventionally employed in the trade.

Among the available commercial emulsifier materials of this type, the following may be employed for the preparation of cationic emulsions in accordance with the invention:

(1) HYAMINE 2389. This is the trademark of a product of Rohm and Haas Chemical Company, of Philadelphia, Pa., for N-alkyl methyl benzyl-N,N,N-trimethyl ammonium chloride, which has the following formula

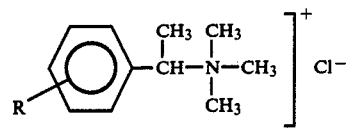

wherein R averages about 12 carbon atoms.

(2) ARQUAD T. This is the trademark of a product of Armak Company of Chicago, Ill., for $C_{14}-C_{18}$ alkyl trimethyl ammonium chloride, which has the following formula:

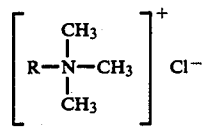

wherein R is a long alkyl chain derived from tallow.

(3) HYAMINE 1622. This is the trademark of a product of Rohm and Haas Chemical Company of Philadelphia, Pa., for di-isobutyl phenoxyethoxy ethyl dimethyl benzyl ammonium chloride monohydrate of the formula:

(4) ARQUAD S. This is the trademark of a product of Armak Company of Chicago, Ill., for $C_{16}-C_{18}$ alkyl trimethyl ammonium chloride, which has the formula:

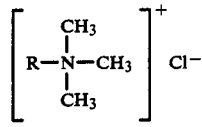

wherein R is a long alkyl chain derived from soybean oil.

It is believed that minor amounts of the starting materials ordinarily are present in the aforementioned emulsifiers as impurities of no consequence to their operativeness according to the invention.

These and other suitable cationic emulsifiers may be employed in varying amounts, generally from about 0.25 to about 5%, and preferably from about 0.40 to about 2% of the active cationic component, based on the weight of the finished emulsion, although more or less may be employed depending upon factors such as the cost of the emulsifier, its effectiveness as an emulsifying agent, the amount of bitumen dispersed, etc.

The Water-Soluble Thickening Agent

The water-soluble thickening agents used in the compositions of this invention are well known. They are compounds which, upon dissolving in water at low concentrations, cause a very dramatic increase in emulsion viscosity. Among the compounds having this property are the guar gums, high molecular weight polyethylene glycol, ethoxylated polyvinyl alcohol, hydroxy ethyl cellulose, ethoxylated cellulose, ethoxylated sorbitol, etc. Representative water-soluble cellulose ethers include sodium carboxymethyl cellulose, sodium carboxymethyl 2-hydroxyethyl cellulose, 2-hydroxyethyl cellulose, methyl cellulose, 2-hydroxypropyl methyl cellulose, 2-hydroxyethyl methyl cellulose, 2-hydroxybutyl methyl cellulose, 2-hydroxyethyl ethyl cellulose, 2-hydroxypropyl cellulose, etc. One preferred material is hydroxy ethyl cellulose made by reacting cellulose with ethylene oxide. Based on total emulsion weight, the concentration of the thickening agent varies from 0.1% to 0.5%, preferably from 0.2% to 0.4%. A second preferred water-soluble agent is methyl cellulose.

The Low-Boiling Hydrocarbon

The emulsion can contain from 0 to 8 weight percent lower-boiling hydrocarbons, preferably 0.01 to 3 weight percent-and more preferably less than 2 weight percent. By lower-boiling hydrocarbons it is meant naphtha and other lower-boiling hydrocarbons which have commonly been used in asphalt emulsions. Generally the emulsion will contain some low-boiling hydrocarbon. However, most preferably, the emulsion is essentially free of naphtha and other lower-boiling hydrocarbons. By "essentially free" it is meant less than 1% by weight relative to the weight of the emulsion and preferably less than 0.1% by weight.

The Aggregate

Suitable aggregates for use with the emulsions of this invention include a wide variety of siliceous and calcareous materials. As previously mentioned, the so-called "open-graded" aggregates are preferred.

The open-graded asphalt mixes are described in "Design and Construction of Emulsified Asphalt Open Grade Mixes and Overlays" by L. D. Coyne presented at the Twenty-Third Annual Road Builders Clinic, University of Idaho, Moscow, Id., Mar. 17, 1972. Such a mix is generally defined as an aggregate blend or asphalt mixture which has a high voids content, usually lacking in fine aggregates (sand) and mineral fillers. Federal Highway Administration, Region 10, Emory Richardson, W. A. Liddle, "Experience in the Pacific Northwest with Open Graded Emulsified Asphalt Pavements" defines the open-graded asphalt-paving mixes characterized by the use of asphalt emulsion, aggregates as crushed stone or crushed gravel aggregate with less than 10 percent passing the No. 10 sieve and 20 to 30 percent air voids in the compacted pavement. A consistent aspect of almost all definitions of open-graded aggregate is that less than 2 percent passes a No. 200 screen. The aggregate should preferably be relatively clean, that is, the presence of substantial quantities of dust will require higher quantities of emulsifier in the mixes.

Combination of the Emulsion and Aggregate

The emulsion is combined with the aggregate by conventional means. The water-soluble thickening agent extends the working time before the emulsion breaks and the mix stiffens in the absence of high levels of naphtha.

The paving composition will contain about 3 to 20, preferably 5 to 10, percent by weight of emulsion and about 97 to 80, preferably about 95 to 90 percent by weight of open-graded aggregate based on the weight of said paving composition.

EXAMPLES

EXAMPLE 1

Open-Graded Mix Workability Test

Apparatus and Materials
1. Mixing spoon. An ordinary 10-inch kitchen mixing spoon is used.
Mixing bowl. A steel bowl with the approximate dimensions of between 8–12 inches in diameter and 4–12 inches in depth will be satisfactory (approximately 3 liters).
3. Aggregate. A representative sample of aggregate that meets open-graded requirements.
4. Water. Distilled water.
5. Stopwatch.
Procedure
1. One thousand (1000) grams of open-graded aggregate was placed into a mixing bowl.
2. A sufficient amount of distilled water was added to the aggregate and mixed for 30 seconds to coat all the stone but not enough water to cause any appreciable runoff (approximately 5–20 grams).
3. The emulsion produced as in Example 3 below was then added to the aggregate as described in Example 4. This mixture was then mixed using a circular motion at a rate of 60 rpm for 2 minutes. The amount of emulsion added should be enough to obtain 100% coating after mixing for 30 seconds but not enough to cause any runoff (approximately 60–80 grams).
4. At the end of the 2-minute mixing cycle, the mix was spread onto a piece of paper and the amount of free-flowing aggregate was measured as a percent of the total aggregate present. Free-flowing aggregate is ⅜-inch size or larger aggregate that is bonded to not more than 5 stones of the same size.
Workability Criteria
The workability of an open-graded mix is measured by determining the amount of free-flowing mix after mixing for 2 minutes as described above.

| Mix Characteristic | Percent Free-Flowing Mix |
|---|---|
| loose | 70–100 |
| medium | 40–60 |
| stiff | 0–30 |

Stiff mixtures are unacceptable for paving.

EXAMPLE 2

Preparation of Emulsifying Water

Six emulsifying water samples (2a–f) were prepared by mixing 136.2 grams Westvaco's Indulin RK-3, an amidoamine diamine blend, with 87.2 grams concentrated HCl to protonate the amines, and with 8.67 lbs. of water at 150° F. The resulting emulsifier mixture was agitated for 10 minutes. In another vessel, 8 lbs. of cold water and 109 grams of a water thickener or thickening agent were combined and stirred until the thickeners had dissolved, about ½ hour at maximum. The two solutions were combined and placed in a colloid mill for emulsification with the asphalt.

The water thickeners used for samples 2a–f are shown in Table I. Viscosities for the resulting solutions were measured using a Brookfield RVT viscometer at 75° F. The results are also shown in Table I.

TABLE I

| Sample No. | Name | Manufacturer | Visc. cp |
|---|---|---|---|
| 2a | Hydroethyl Cellulose MW ≃ 81,000 g/mole | Spectrum Chem. Corp. Cat. #HY112 | 16.4 |
| 2b | Methyl Cellulose 400 cp | Spectrum Chem. Corp. Cat. #ME136 | 82.4 |
| 2c | Polyvinyl Alcohol | Spectrum Chem. Corp. Cat. #PO141 | 13.2 |
| 2d | Polyethylene Glycol #400 NF | Spectrum Chem. Corp. Cat. #PO110 | 8.0 |
| 2e | Hydroxyethyl Cellulose Natrosol 250-H4BR MW = 1.1 × $10^6$ g/mole | Hercules, Inc. | 642 |
| 2f | None | | 9.0 |

EXAMPLE 3

Preparing the Emulsions thirty-two grams of the emulsifying water of samples 2a–f were combined in a colloid mill at 4000 rpm with 68 grams of asphalt having a penetration of 77° F. of 123 dmm (ASTM D-5). The asphalt temperature was 280° F., the thickened water was at 100° F., and the mixture was emulsified at a backpressure of 15 psi. After preparing the emulsions, 3 grams of petroleum naphtha was added. The resulting emulsions had the properties shown in Table II.

TABLE II

| Emulsion Formulations | 3a | 3b | 3c | 3d | 3e | 3f |
|---|---|---|---|---|---|---|
| Asphalt, wt % | 68.00 | 68.00 | 68.00 | 68.00 | 68.00 | 68.00 |
| Amidoamine, wt % | 0.50 | 0.50 | 0.50 | 0.50 | 0.50 | 0.50 |
| HCl, wt % | 0.32 | 0.32 | 0.32 | 0.32 | 0.32 | 0.32 |
| Natrosol 250-H4BR, wt % | — | — | — | — | 0.40 | — |
| Polyethylene Glycol, wt % | — | — | — | 0.40 | — | — |
| Polyvinyl Alcohol, wt % | — | — | 0.40 | — | — | — |
| Methyl Cellulose | — | 0.40 | — | — | — | — |
| Hydroxyethyl Cellulose, wt % | 0.40 | — | — | — | — | — |
| Water, wt % | 27.78 | 27.78 | 27.78 | 27.78 | 27.78 | 28.18 |
| Naphtha*, wt % | 3.00 | 3.00 | 3.00 | 3.00 | 3.00 | 3.00 |
| Emulsion Data | | | | | | |
| Residue, H.P., % | 68.0 | 67.3 | 69.5 | 68.6 | 74.9 | 68.6 |
| Vis. @122° F., SFS | 210 | 162 | 174 | 261 | 1000+ | 143 |
| Sieve, 20 mesh, % | 0.00 | 0.00 | 0.00 | 0.00 | 0.00 | 0.00 |

*Naphtha was post-added.

EXAMPLE 4

One thousand (1000) grams of aggregate was used with each of 04 the emulsions, 3a–e. The aggregate size and weight used are shown below.

| (Open-Graded Specification) | | |
|---|---|---|
| Aggregate Size (Bin #) | Weight for a 1000-gram batch (g) | Gradation, % Passing |
| ½ | 0 | |
| ½ × ⅜ | 400 | 60 |
| ⅜ × ¼ | 300 | 30 |
| ¼ × #4 | 200 | 10 |
| #4 × #10 | 90 | 1 |
| −200 | 10 | 0 |
| Total | 1000 | |

One thousand (1000) grams of aggregate was mixed with 10 grams of water, followed by 80 grams of emulsion. This mixture was stirred in a 3000-ml stainless steel bowl for 2 minutes with a spoon having a surface area of about 12 square inches with a 10-inch handle. The workability of the mix was judged using the Mix Workability Test of Example 1. Nine hundred fifty (950) grams of this mixture was put in a 1000-ml plastic funnel having a one-inch wide narrow end containing a 20-mesh metal screen. The mix was allowed to drain for 30 minutes. The water and asphalt that ran off is defined as runoff.

Low runoffs, i.e., less than 10% of the total asphalt emulsion added to the aggregate mix, are desirable and acceptable. Low runoffs under these conditions mean that the emulsion will not drain from the mixing mill or transport trucks prior to use, i.e., construction.

Results for aggregate emulsion mixtures 4a–e are shown in Table III. As can be seen, Emulsions b, c, and e produced workable mixtures.

Sample 4b, the 400 cp methyl cellulose, and sample 4e, the high molecular weight hydroxyethyl cellulose (Natrosol 250-H4BR) also had very low runoff. Samples 4b and 4e are within the scope of our invention. Samples 4a, 4c, 4d, and 4f are not within the scope of the invention.

TABLE III

| Sample No. | Emulsion Additive | Percent Free-Flowing | Comments | Percent Coating | Percent Coating After Wash-Off Asphalt | Runoff, % Emulsion | Emulsifying Water Viscosity, cp | Emulsion Viscosity SSF |
|---|---|---|---|---|---|---|---|---|
| 4a | Hydroxyethyl Cellulose | 20 | (Stiff) | 100 | 100 | 4.4 | 16.4 | 210 |
| 4b | Methyl Cellulose | 60 | (Med) | 100 | 100 | 0 | 82.4 | 162 |
| 4c | Polyvinyl Alcohol | 50 | (Med) | 100 | 100 | 31.2 | 13.2 | 174 |
| 4d | Polyethylene Gylcol | 10 | (Stiff) | 100 | 100 | 45.1 | 8.0 | 261 |
| 4e | Natrosol 250-H4BR | 50 | (Med) | 100 | 100 | 0 | 642.0 | 1000+ |
| 4f | None | 30 | (Stiff) | 100 | 100 | 13.9 | 9.0 | 143 |

EXAMPLE 5

Preparation of the Water-Soluble Thickened Asphalt Emulsion

Ten (10) parts of cold water was mixed with 0.30 parts of a water soluble thickener, a hydroxy ethyl ether of cellulose, Natrosol 250H4BR, manufactured by Hercules Inc., in a tank No. 1. The mixture was agitated for 2 minutes, then pumped to a tank No. 2. In tank No. 1 ten (10) parts water were mixed with one (1) part of an emulsifier, Tyfo K, purchased from National Research Chemicals Co. which is believed to be an $C_{12}$–$C_{18}$ imidazoline trimethyl ammonium chloride and heated to 140° F. 0.76 parts HCl (32 baume) was added to tank No. 1 and agitated for 10 minutes. The material in Tank No. 1 was then pumped to tank No. 2 and agitated. 9.94 parts water was added to tank No. 2 and agitated. The pH was adjusted to 2.48 with HCl. The mixture was heated to 99° F.

Sixty-five (65) parts of soft emulsion base asphalt (Willbridge, Ore.) at 262° F. were combined with the water mixture above in a colloid mill. To the resulting asphalt emulsion was added three (3) parts hydrocarbon naphtha.

Coating the Aggregate

In a Calenco pug mill 92.9 parts aggregate consisting of aggregate passing through a ½ inch sieve and collected on a No. 4 sieve with 0.3 percent passing the No. 200 sieve and 0.5 parts natural moisture were mixed with 6.6 parts of the emulsion described above.

Placing the Pavement

The above mixture was placed on a test strip using a Cedar-Rapids paving machine. A ten (10)-ton Ingram steel roller was used immediately upon laydown to compact the mixture. A fine aggregate (choke) was then placed over the road to prevent the mixture from being picked up by tires.

EXAMPLE 6

Asphalt emulsions substantially as described above were tested in the laboratory with and without a thickener and with and without various amounts of naphtha ranging from zero percent up to a maximum amount of 8 percent naphtha. When mixed with typical open-graded aggregate the emulsions with less than 3% naphtha and without the water-soluble thickener added did not coat the aggregate well. The resulting mixes were stiff and hard to place. With the addition of a thickener to the emulsions (Natrosol 250H4BR) the system coats and mixes much better providing an aggregate/asphalt emulsion suitable for paving. The degree of coating was determined by mixing the emulsion with aggregate using a spoon and bowl. A visual determination was made as to how much emulsion and/or asphalt coated the aggregate. The stiffness of the emulsion/aggregate mixture was determined by pulling a standard sized disk through a specific amount of the test aggregate/asphalt emulsion mixture and measuring the pull force. Systems with low naphtha contents (3 percent or less) and no thickener give high "pull values" which indicates a stiff mix which is not suitable for paving.

As will be evident to those skilled in the art, various modifications in this invention can be made or followed, in the light of the foregoing disclosure and discussion, without departing from the spirit or scope of the disclosure or from the scope of the following claims.

what is claimed is:

1. A medium set cationic bituminous emulsion comprising, relative to the emulsion:
   a. about 40 to 75% by weight asphalt;
   b. 0.25 to 5% by weight of a cationic emulsifier;
   c. 0.1 to 0.5% by weight of a nonionic water-soluble thickening agent;
   d. 0 to 8% of a low-boiling hydrocarbon; and
   e. water as a continuous phase of said emulsion to make up 100% by weight;

wherein said medium set emulsion when combined with open-graded aggregate/produces a mix which has a thick coating of emulsion on said aggregate surface and said mix is workable and has a minimum runoff of less than 10 percent of the total emulsion added to said aggregate.

2. The emulsion of claim 1 wherein said thickening agent is selected from guar gums, high molecular weight polyethylene glycol, ethoxylated polyvinyl alcohol, ethoxylated cellulose, and ethoxylated sorbitol and the thickening agent when dissolved in said water in the absence of said asphalt has a viscosity at 75° F. between 50 and 1000 centipoise.

3. The emulsion of claim 1 wherein said thickening agent is hydroxy ethyl cellulose or methyl cellulose.

4. The emulsion of claim 3 wherein the concentration of said thickening agent is from 0.2% to 0.4% by weight and the thickening agent when dissolved in said water in the absence of said asphalt has a viscosity at 75° F. between 100 and 700 centipoise.

5. The emulsion of claim 2 wherein the concentration of said low-boiling hydrocarbon is 0.01 to 3.0 weight percent.

6. The emulsion of claim 5 wherein the concentration of said low-boiling hydrocarbon is less than 2 weight percent.

7. The emulsion of claim 6 wherein the cationic emulsifier is a salt of a quaternary nitrogen base.

8. The emulsion of claim 7 wherein the cationic emulsifier is an alkyl trimethyl ammonium chloride.

9. A paving composition comprising about 80 to 97% by weight of an open-graded aggregate and about 3 to 20% asphalt, wherein said composition is formed by mixing said aggregate with the emulsion of claim 1.

10. The composition of claim 9 comprising 90 to 95% by weight aggregate and 5 to 10% asphalt.

11. A cationic bituminous emulsion comprising relative to the emulsion about 60 to 70% by weight asphalt, 0.4–2% by weight of a cationic emulsifier, 0.2–0.4% by weight of a water-soluble thickening agent, 0.01 to 3 percent by weight of a low-boiling hydrocarbon, and water as a continuous phase of said emulsion to make up 100% by weight; and wherein said set emulsion when combined with open-graded aggregate produces a mix which has a thick coating of emulsion on said aggregate surface and said mix is workable and has a minimum runoff of less than 10 percent of the total emulsion added to said aggregate and said thickening agent when dissolved in said water in the absence of said asphalt has a viscosity at 75° F. between 50 and 1000 centipoise.

12. The emulsion of claim 11 wherein said thickening agent is selected from ethoxylated polyvinyl alcohol, ethoxylated cellulose, ethoxylated sorbitol, hydroxy ethyl cellulose or methyl cellulose.

13. The emulsion of claim 12 wherein the concentration of said low-boiling hydrocarbon is 0.01 to 3.0 weight percent.

14. The emulsion of claim 13 wherein the cationic emulsifier is a salt of a quaternary nitrogen base.

15. The emulsion of claim 14 wherein the cationic emulsifier is a alkyl trimethyl ammonium chloride.

16. A paving composition comprising about 80 to 97% by weight of an open-graded aggregate and 3 to 20% by weight of a-cationic bituminous emulsion, said emulsion comprising, relative to the emulsion, about 60 to 70% by weight asphalt, 0.4–2% by weight of a cationic emulsifier, 0.2 to 0.4% by weight of a water-soluble thickening agent, less than 2% by weight of a low-boiling hydrocarbon, and water as a continuous phase of said emulsion to make up 100% by weight; and wherein said emulsion when combined with open-graded aggregate produces a mix which has a thick coating of emulsion on said aggregate surface and said mix is workable and has a minimum runoff of less than 10 percent of the total emulsion added to said aggregate.

17. The paving composition of claim 16 wherein said thickening agent is selected from guar gums, high molecular weight polyethylene glycol, ethoxylated polyvinyl alcohol, ethoxylated cellulose, and ethoxylated sorbitol.

18. The paving composition of claim 17 wherein the concentration of said low-boiling hydrocarbon is 0.01 to 3.0 weight percent.

19. A medium set emulsion comprising:
   a. about 40 to 75% by weight asphalt;
   b. 0.25 to 5% by weight of a cationic emulsifier;
   c. thickened water to make 100 % by weight said thickened water having a viscosity at 75° F. of greater than 20 centipoise.
and wherein said thickened water is prepared by dissolving 0.1 to 0.5% by weight of a nonionic water-soluble thickening agent in said water.

20. The emulsion of claim 19 wherein said thickened water has a viscosity at 77° F. between 50 to 1000 centipoise.

21. The emulsion of claim 20 wherein said thickened water has a viscosity at 77° F. between 100 to 700 centipoise.

* * * * *